United States Patent [19]
Ralston

[11] 3,910,353
[45] Oct. 7, 1975

[54] HYDRAULIC PLOW STEERING
[75] Inventor: Harold A. Ralston, Bettendorf, Iowa
[73] Assignee: J. I. Case Company, Racine, Wis.
[22] Filed: May 3, 1974
[21] Appl. No.: 466,592

[52] U.S. Cl. .................. 172/1; 60/584; 60/592; 172/282; 172/285; 280/426; 280/442
[51] Int. Cl.² ............ A01B 79/00; A01B 69/08; B62D 13/00; F15B 7/10
[58] Field of Search ............ 60/464, 542, 584, 592; 92/79; 172/1, 282–285, 294, 316; 280/419, 426, 442, 443

[56] References Cited
UNITED STATES PATENTS

| | | | |
|---|---|---|---|
| 2,524,544 | 10/1950 | Seawell | 60/584 |
| 2,544,134 | 3/1951 | Clark | 60/592 X |
| 2,761,693 | 9/1956 | Stover | 280/442 X |
| 2,862,360 | 12/1958 | Audemar | 60/584 X |
| 3,152,448 | 10/1964 | Mercier | 60/592 X |
| 3,511,317 | 5/1970 | Richey | 172/285 X |
| 3,598,185 | 8/1971 | Richey | 172/285 X |
| 3,636,708 | 1/1972 | Karman et al. | 60/464 X |

FOREIGN PATENTS OR APPLICATIONS

| | | | |
|---|---|---|---|
| 396,652 | 1966 | Switzerland | 280/426 |

Primary Examiner—Clifford D. Crowder
Assistant Examiner—Steven A. Bratlie
Attorney, Agent, or Firm—Cullen, Settle, Sloman & Cantor

[57] ABSTRACT

A semi-mounted plow frame includes a furrow wheel which is steered to follow the turning radius of a prime mover. A master-slave hydraulic steering system includes a first piston and cylinder interconnected between the front of the plow frame and the rear of the prime mover such that the piston is reciprocated in direct relationship to angular directional variations between the frame and prime mover. A second piston and cylinder is pivotally connected between the rear of the plow frame and the furrow wheel. Hydraulic lines interconnect the first and second cylinders to reciprocate the second piston in direct relationship to the reciprocation of the first piston to thereby steer the furrow wheel. The hydraulic lines between the first and second cylinders are interconnected to the hydraulic lift system of the prime mover so that air may be purged from the hydraulic steering system.

6 Claims, 4 Drawing Figures

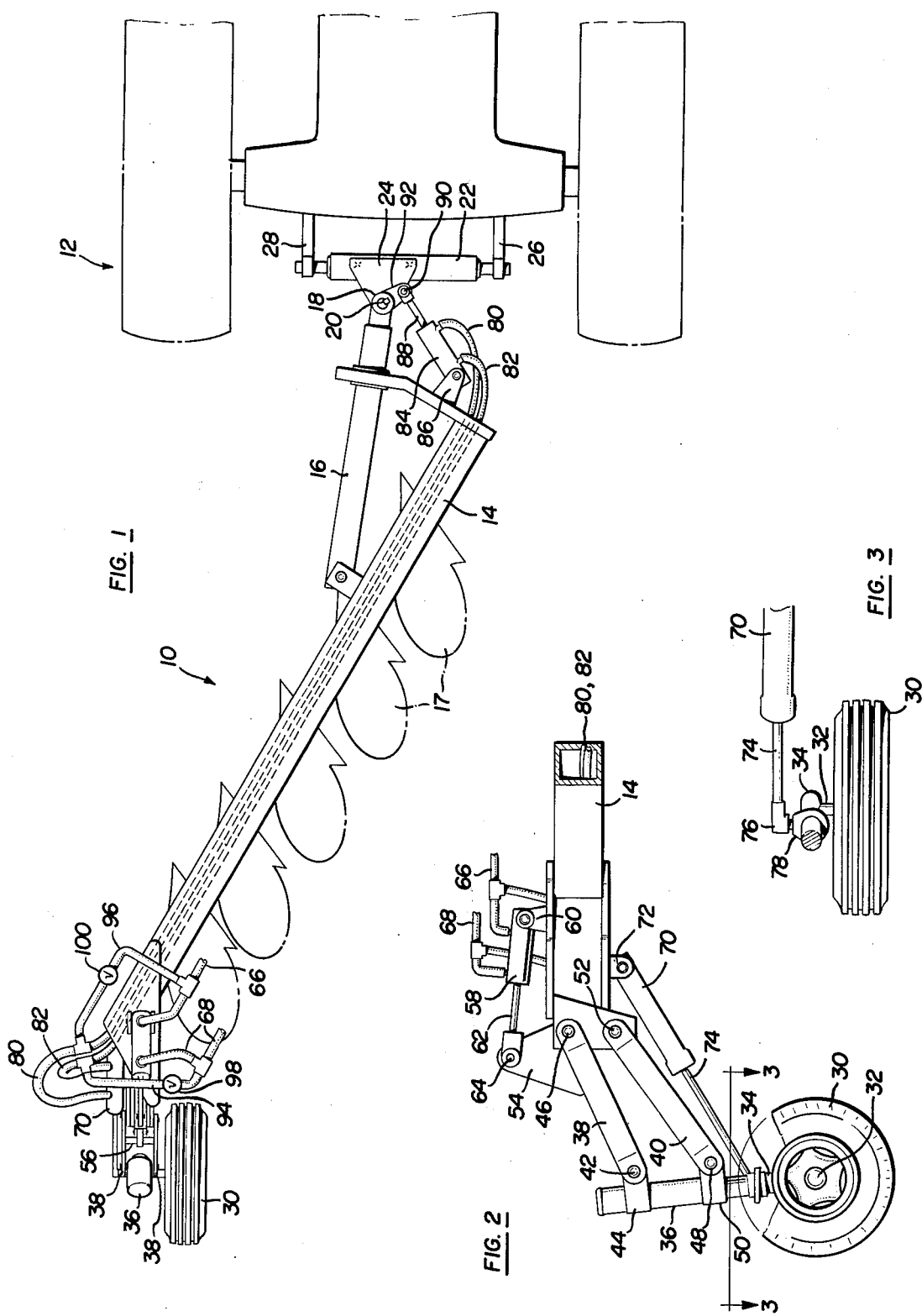

HYDRAULIC PLOW STEERING

BACKGROUND OF THE INVENTION

1. Field of the Invention

The present invention relates generally to semi-mounted plows having a hydraulically steerable rear wheel and a hydraulic lift system. More particularly, this invention relates to a hydraulic connection between the hydraulic steering and lift systems.

2. The Prior Art

In the early prior art semi-mounted plow frames were connected to tractors through swinging draw bar links so that the plow frame could follow the tractor or prime mover around slight curves. This connection prevented the plow frame from following the prime mover around a short turning radius, thereby requiring relatively wide headlands at opposite ends of the field being worked. In order to overcome these shortcomings, the prior art turned to linkage members for positively steering the rear wheel so that the plow frame would follow the prime mover around relatively short radius curves. Examples of such arrangements are illustrated by U.S. Pat. No. 3,061,020 to Mannheim and U.S. Pat. No. 3,228,484 to Arnold. Because of the inherent disadvantages and shortcomings in mechanical linkages, such as expense and malfunctions, prior art attempts were directed to hydraulic steering systems shown for example by U.S. Pat. No. 2,982,363 to Sweet and U.S. Pat. No. 3,598,185 to Richey.

These hydraulic steering systems, however, are not without problems. For example, once the hydraulic installations are made, a significant volume of air may be trapped within the steering cylinders and hydraulic lines. Since air is compressible under load, it adversely affects the proper steering of the rear wheel in response to turning of the prime mover. Even if all the air is purged from the steering hydraulic system at the time when it is filled with hydraulic fluid, air may still later enter the system because of leakage of hydraulic fluid at coupling points or through the cylinders. As leakage occurs, the rear wheel becomes misaligned from its proper phase relationship with the master cylinder of the hydraulic steering system.

Prior to the present invention, there was no simple means for replenishing the hydraulic steering system with hydraulic fluid to account for leakage.

SUMMARY OF THE INVENTION

The present invention includes a semi-mounted mold board plow frame which is pivotally connected to the rear of a prime mover. A hydraulic steering circuit includes two hydraulic cylinders and pistons and interconnects the rear of the prime mover with a steerable furrow wheel at the rear of the plow frame. One of the cylinders of the hydraulic steering system is pivotally connected to the forward end of the plow frame; its associated piston is pivotally connected to the rear of the prime mover in such a manner that it is reciprocated within the cylinder because of directional variations between the prime mover and the plow frame. This first cylinder is hydraulically interconnected with the second cylinder at the rear of the plow frame by a pair of hydraulic lines. The second cylinder is pivotally connected to the frame and its piston is operably mounted to the rear wheel for steering. Reciprocation of the first piston circulates hydraulic fluid through the pair of hydraulic lines to reciprocate the piston at the rear of the plow frame to positively steer the wheel so that it follows the turning radius of the prime mover.

A hydraulic lift cylinder is mounted at the rear of the plow frame and is interconnected with a hydraulic power source of the prime mover.

In order to overcome the problems experienced by prior art hydraulic steering systems, the present invention includes a pair of lines interconnecting the hydraulic lift system with the hydraulic steering system. Each of the interconnecting lines includes a valve which is normally closed to isolate the hydraulic steering system. When air becomes entrapped in the hydraulic steering system, the valves are opened so that hydraulic fluid from the prime mover may be circulated between the two hydraulic systems to purge the air from the steering system.

BRIEF DESCRIPTION OF THE DRAWINGS

FIG. 1 is a top plan view illustrating the semi-mounted plow frame of the present invention.

FIG. 2 is a detailed sectional view of the rear of the plow frame, illustrating the hydraulic lift and steering systems.

FIG. 3 is a detailed top plan view along line 3—3 of FIG. 2, illustrating the connection between the hydraulic steering cylinder and the rear wheel.

DETAILED DESCRIPTION OF THE INVENTION

Figure 4:
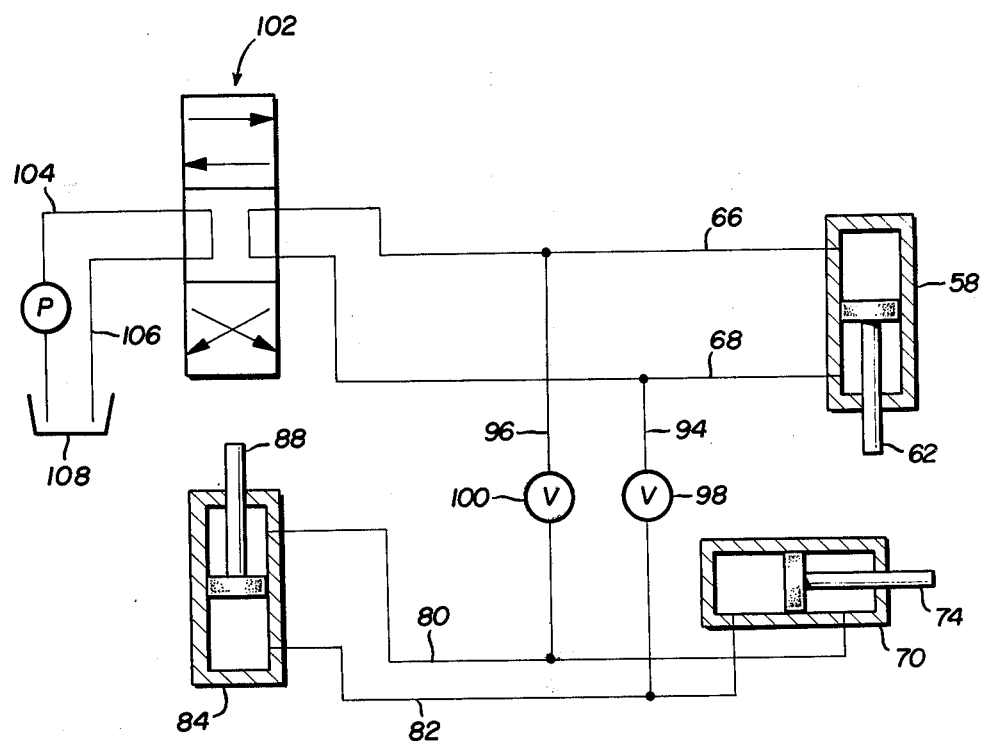
FIG. 4 is a schematic view illustrating the interconnection between the hydraulic steering system and the hydraulic lift system, which is connected to a hydraulic power source of the prime mover.

FIG. 1 illustrates a semi-mounted plow assembly 10 operably mounted on the rear of a prime mover 12, such as a tractor. The plow assembly includes a diagonally extending frame 14 and a stabilizing beam 16. In preferred embodiment, frame 14 is a hollow channel, as illustrated in FIG. 2, for strength and rigidity. A plurality of agricultural implements, shown in phantom by reference numeral 17, are mounted generally from the bottom of the plow frame assembly.

The forward end of stabilizing beam 16 includes a cylindrical mounting sleeve 18 pivotally mounted to a vertical mounting post 20. The mounting post is rigidly mounted on a cross bar 22 by means of plate 24. The cross bar is conventionally connected to draft links 26 and 28 of a conventional tractor hitch, which can be raised and lowered by appropriate hydraulic power means on the prime mover.

The rear of plow frame 10 is supported upon a rear wheel 30 through a conventional lift mechanism. Rear wheel 30 is mounted upon axle 32 which is rigidly attached to steering shaft 34. The steering shaft is rotationally mounted in a non-rotatable sleeve 36. The lift linkage system includes sets of links 38 and 40 interconnecting sleeve 36 to plow frame 14. Links 38 are pivotally connected to sleeve 36 about a common pin 42 on collar 44 and to frame 14 by pin 46. Links 40 (only one of which can be seen in FIGS. 1 and 2) are pivotally connected to sleeve 36 on a common pin 48 on collar 50 and to frame 14 by pin 52. A bell crank lever 54 is also pivotally connected to pin 46 and is rigidly attached to links 38, for example, by cross bar 56 as illustrated in FIG. 1. A hydraulic lift cylinder 58 is pivotally mounted on frame 14 by a trunnion mounting 60. Piston rod 62 is pivotally mounted at 64 to the bell crank lever to effect raising and lowering of the plow frame relative to the rear wheel assembly. As illustrated, the plow frame is in a raised position. To lower plow frame 14, hydraulic fluid is introduced into cylinder 58 through line 68 to retract piston rod 62. Hydraulic fluid is conveyed to line 68 through the hydraulic power source on the prime mover; simultaneously, hydraulic fluid is forced out of the forward portion of cylinder 58 into line 66 and back to the hydraulic power source, as discussed in greater detail below.

Rear wheel 30 includes a controlled steering mechanism having hydraulic cylinder 70 which is pivotally mounted to frame 14 by trunnion 72. Piston rod 74 of hydraulic cylinder 70 is pivotally connected at 76 to a collar 78, which is non-rotatably mounted on steering shaft 34. Hydraulic lines 80 and 82 are connected to deliver hydraulic fluid to cylinder 70 to effect appropriate reciprocal movement of piston rod 70 to steer the rear wheel.

Lines 80 and 82 are connected at their forward ends to a master hydraulic cylinder 84 which is pivotally connected to frame 14 by trunnion 86. Piston rod 88 of the master cylinder is pivotally connected at 90 to a steering link 92 which is non-rotatably connected to mounting post 20. As the prime mover is turned relative to the plow frame, piston rod 88 will be retracted or extended. For example, when the prime mover 12 turns left, as viewed in FIG. 1, piston rod 88 will be extended due to the relative change in angular position between the prime mover and plow frame. As a result, hydraulic fluid is forced out of the forward end of hydraulic cylinder 84 through line 80 to the rear portion of hydraulic cylinder 70. Piston rod 74 is respindingly retracted within hydraulic cylinder 70 to cause steering wheel 30 to rotate in a clockwise manner (as viewed in FIG. 3) so that the plow frame will follow in the same turning radius as the prime mover. If the prime mover turns to the right, as viewed in FIG. 1, piston rod 88 will be retracted into cylinder 84 by the relative pivoting motion between the prime mover and the plow frame about the pivot axis of mounting post 20. In this situation hydraulic fluid will be forced out of the rear portion of cylinder 84 into hydraulic line 82 and into the forward portion of cylinder 70. As a result, piston rod 74 is extended to rotate wheel 30 in a counter clockwise motion so that plow frame 14 follows the same turning radius as the prime mover.

It has been found that hydraulic rear wheel steering systems as previously described inherently lose hydraulic fluid due to leakage. As a result, the steering wheel becomes misaligned relative to the front hydraulic cylinder 84. Further, because air is compressible under load, any retraction or extension of piston rod 88 tends to compress the entrapped air rather than effecting proper retraction or extension of piston rod 74. To overcome this problem, the present invention proposes interconnecting the rear lift hydraulic system and the wheel steering hydraulic system.

As illustrated in FIG. 1, a hydraulic line 94 is connected at one of its ends to hydraulic lift line 68 and at its other end to steering hydraulic line 82. A second hydraulic line 96 is connected at its opposed ends to hydraulic lines 66 and 80. Hydraulic lines 94 and 96 include normally closed screw-type valves 98 and 100, respectively, which are schematically illustrated for purposes of clarity. A suitable valve for this purpose is sold under the trade name Pneu-Trol by the Fluid Components Division of Deltrol Corporation.

FIG. 4 further illustrates the hydraulic interconnection of the rear lift cylinder with a hydraulic power system on the prime mover. Lines 66 and 68 are suitably coupled (not shown) to lines from a four-way spool valve 102 within the hydraulic system of the prime mover. Lines 104 and 106 are connected between a hydraulic reservoir in the prime mover and spool valve 102, with a pump P being located along line 104.

As illustrated in FIG. 4, to raise the plow frame relative to rear wheel 30, spool valve 102 is positioned so that hydraulic fluid pumped from reservoir 108 through pump P and hydraulic line 104 flows through line 66 into the forward end (or upper end as viewed in FIG. 4) of cylinder 58 to extend piston rod 62. As a result of piston rod 62 being extended, hydraulic fluid is forced out of the rear portion (or lower portion as viewed in FIG. 4) into hydraulic line 68 back through the spool valve into line 106 and reservoir 108. To lower the plow frame, spool valve 102 is positioned so that hydraulic fluid pumped from reservoir 108 through line 104 flows into line 68 to retract piston rod 62.

As discussed previously, air can become entrapped in the hydraulic steering circuit due to hydraulic fluid leakage or due simply to the manner of installing the system. To overcome this problem, lines 94 and 96 are provided to interconnect the lift hydraulic circuit with the hydraulic steering circuit.

When air does become entrapped within the hydraulic steering circuit, valves 98 and 100 are opened and hydraulic fluid is alternately circulated from line 104 into lines 66 and 68 by switching spool valve 102. This operation forces hydraulic fluid alternately into lines 80 and 82 of the hydraulic steering system. Hydraulic fluid flowing back to reservoir 108 entrains substantially all of the entrapped air and removes if from the hydraulic steering system. For example, with valves 98 and 100 opened and spool valve 102 positioned so that hydraulic fluid will flow into line 66, hydraulic fluid pumped from reservoir 108 first causes piston rod 62 to extend. Thereafter, any hydraulic fluid entering line 66 is circulated through line 96 into hydraulic line 80. This hydraulic fluid flows into the upper end of hydraulic cylinder 84 and the right side of hydraulic cylinder 70 (as viewed in FIG. 4). When piston rods 74 and 88 have been retracted as far as they can be, spool valve 102 is switched so that hydraulic fluid will then flow into line 68 and the lower portion of hydraulic cylinder 58. After piston rod 62 has been retracted, any further hydraulic fluid pumped into line 68 flows into lines 94 and 82 to cause both piston rods 74 and 88 to be extended. Spool valve 102 is switched back and forth several times to cause circulation of hydraulic fluid so that entrapped air will be conveyed back to sump 108 where it can be released to the atmosphere. After a sufficient number of cycles to remove entrapped air from the hydraulic steering system, piston rods 74 and 88 are manually set in their proper phase relationship so that plow frame 14 will follow in the same turning radius as the prime mover. Normally rear wheel 30 is adjusted to lead toward the plowed ground in order to help absorb side draft forces. After the hydraulic cylinders have been properly set, valves 98 and 100 are closed to isolate the hydraulic steering circuit from the hydraulic lift circuit.

Another advantage afforded by the present invention is the ability to adjust the "phase relationship" or "lead angle" of the steerable wheel relative to the position of the master cylinder and piston. As indicated previously, the rear steering wheel 30 will normally be adjusted to lead toward the plowed ground in order to help absorb side draft forces. However, different soil conditions produce different type reaction forces on the rear wheel. Accordingly, it then becomes necessary to vary the lead angle of the wheel so that the plow properly tracks the direction of the tractor. This is accomplished in the present invention by simply opening the valves 98 and 100 and manually adjusting the rear steering wheel 30 to the desired lead angle. In response to this adjustment hydraulic fluid flows from one end of the slave cylinder 70 into the hydraulic lift circuit and from the hydraulic lift circuit into the other end of the slave cylinder. After the steering wheel is placed in the desired angular position, valves 98 and 100 are once again closed. Without the presently proposed interconnection between the hydraulic steering circuit and the hydraulic lift circuit such a rear wheel adjustment would require bleeding hydraulic fluid from one line and feeding it into the another. The present invention is far superior due to its simplicity and economy.

It is to be understood that the previously described embodiments are exemplary and not intended to be limiting in any way.

Having fully and completely described my invention, I claim:

1. In an earth working implement having a steering system including a master cylinder and piston interconnected between the front of the implement and the rear of a prime mover, and a slave cylinder and piston pivotally connected between the rear of the implement and a steering wheel, with said cylinders being interconnected by a pair of separate conduits to define a closed hydraulic circuit, said slave cylinder steering the earth working implement in response to hydraulic fluid circulated through said pair of conduits by said master cylinder in response to steering of the prime mover, said earth working implement further including means for lifting the implement relative to the steering wheel, wherein said lifting means includes a second hydraulic circuit through which hydraulic fluid flows under pressure, the improvement of means for purging entrapped air from said master and slave cylinders and from each of said separate conduits comprising a purging conduit connecting each conduit of the steering system to said second hydraulic circuit, and normally closed valve means in each of said purging conduits isolating said second hydraulic circuit from said closed hydraulic circuit, said valve means being openable for flowing hydraulic fluid between the two hydraulic circuits.

2. In a semi-mounted plow having a steerable furrow wheel and a closed master-slave hydraulic steering system wherein a master cylinder responsive to tractor steering movement is hydraulically connected by a pair of conduits to a slave cylinder located at the furrow wheel to correspondingly actuate the slave cylinder so that the furrow wheel accurately tracks the tractor, said plow further including means for lifting the plow relative to the steerable furrow wheel, and an external hydraulic system having a source of hydraulic fluid under pressure, a sump and a pair of hydraulic conduits interconnecting said sump and said lifting means, the improvement of means for purging entrapped air from hydraulic fluid in the closed master-slave system, including purging conduits interconnecting each of the master-slave system conduits to respective conduits of the external hydraulic system, and manually actuatable valves in said purging conduits, said valves being normally closed and being openable to accommodate circulation of hydraulic fluid from said external system into and through said master-slave hydraulic system and then back to said sump for purging air from said master-slave system.

3. A semi-mounted plow, comprising:
 a generally horizontal frame member pivotally connected to the rear of a prime mover about a generally vertical pivot axis;
 a wheel steerably mounted to the plow frame member about a generally vertical rotational steering axis;
 linkage means for raising and lowering the frame relative to the steering wheel;
 a hydraulic piston and cylinder connected between the frame and linkage means for effecting said raising and lowering, said cylinder connected to a hydraulic power source on said prime mover by a first pair of hydraulic lines;
 a master piston and cylinder connected between the forward end of said frame and the rear of said vehicle, said piston being reciprocated within said cylinder in response to angular directional variations between said vehicle and frame;
 a steering piston and cylinder connected between the rear of said frame and the steering wheel;
 a second pair of hydraulic lines interconnecting the master cylinder and steering cylinder;
 hydraulic fluid within said master cylinder, steering cylinder, and second pair of hydraulic lines, said hydraulic fluid reciprocating the steering piston in direct relationship to reciprocation of said master piston to rotate the steering wheel so that the frame follows the same turning arc as the vehicle;
 a third pair of hydraulic lines, one line of said third pair being connected at its opposed ends to one of the hydraulic lines of said first and second pairs of hydraulic lines, the other line of said third pair being connected at its opposed ends to the other lines of said first and second pairs of hydraulic lines;
 a valve in each line of said third pair of hydraulic lines, said valves being (1) openable to remove entrapped air from the hydraulic steering system and to replenish any loss of hydraulic fluid and (2) closeable to isolate the hydraulic steering circuit from the hydraulic circuit for raising and lowering the frame.

4. In a method of purging entrapped air from a master-slave hydraulic steering system on a semi-mounted plow, wherein said master-slave system includes a pair of hydraulic conduits interconnecting a slave cylinder steering a wheel on the plow and a master cylinder responsive to tractor turning movement, comprising the steps of:
 1. providing an independent hydraulic circuit having a sump vented to the atmosphere and conduits interconnected to a means for lifting the plow relative to said wheel;
 2. alternately interconnecting each of said master-slave hydraulic conduits to respective conduits of said independent hydraulic circuit;
 3. alternately flowing hydraulic fluid from said independent hydraulic circuit into and out of each said master-slave hydraulic conduits;

4. transferring entrapped air from said master-slave hydraulic system to said independent hydraulic circuit during step 3; and
5. flowing the entrapped air to said sump and removing it from the independent hydraulic circuit.

5. The method defined in claim 4, characterized by repeatedly performing step 3 to remove substantially all of the entrapped air from said master-slave hydraulic system.

6. In a method of adjusting the setting of a steering wheel on a semi-mounted plow, wherein said wheel is steered by a hydraulic system including a pair of hydraulic conduits interconnecting a slave cylinder and piston steering the wheel and a master cylinder and piston responsive to tractor turning movement, the steps of:
1. interconnecting the pair of hydraulic conduits to an independent hydraulic source, which includes a hydraulic lift system for the plow;
2. adjusting the steering angle of the wheel relative to the master cylinder and piston by adjusting the slave piston relative to the master piston postion and thereby flowing hydraulic fluid between the slave cylinder and the independent hydraulic source; and
3. isolating said hydraulic steering system from the independent hydraulic source so that the slave piston is responsive to movement of the master piston.

* * * * *